Dec. 30, 1969  P. L. MAY ETAL  3,486,439
AGRICULTURAL APPARATUS
Original Filed June 23, 1965
6 Sheets-Sheet 1
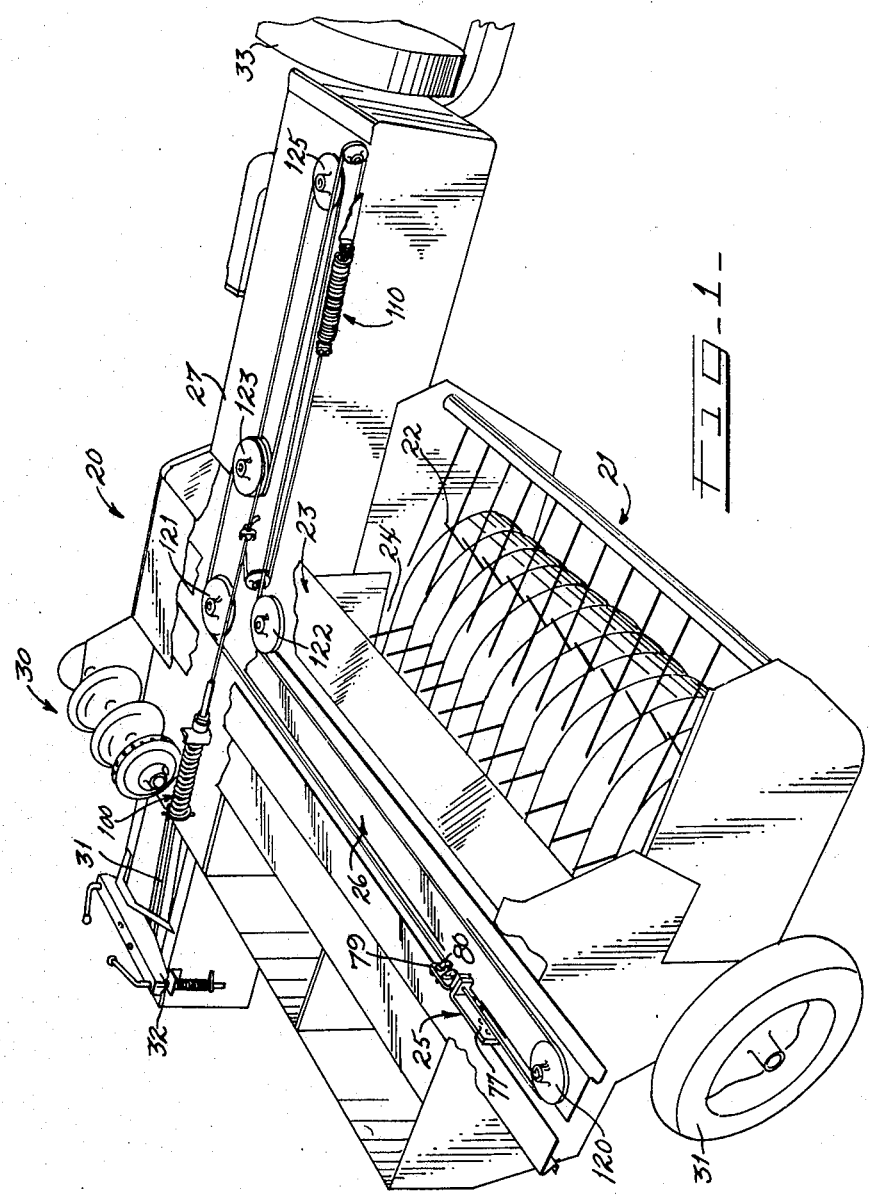
INVENTOR.
CLYDE G. VIDRINE
PATRICK L. MAY
RALPH E. BEYER
BY
ATT'Y.

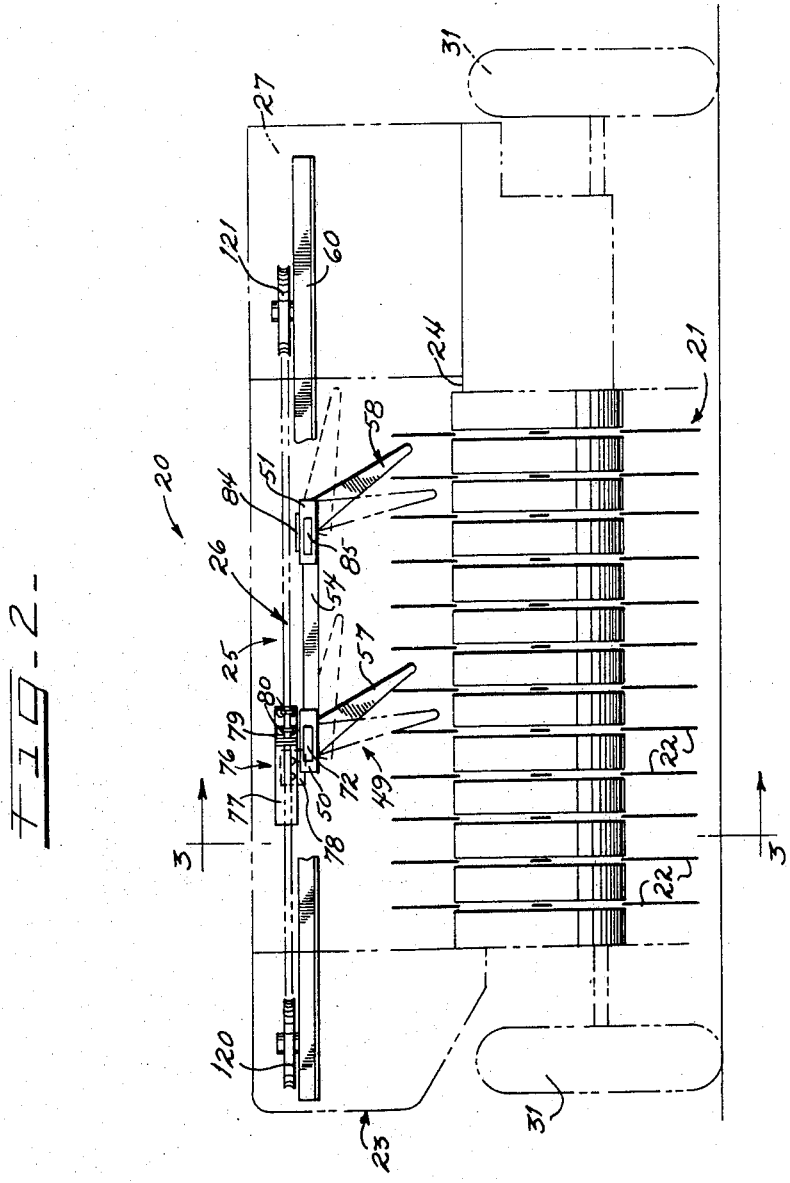

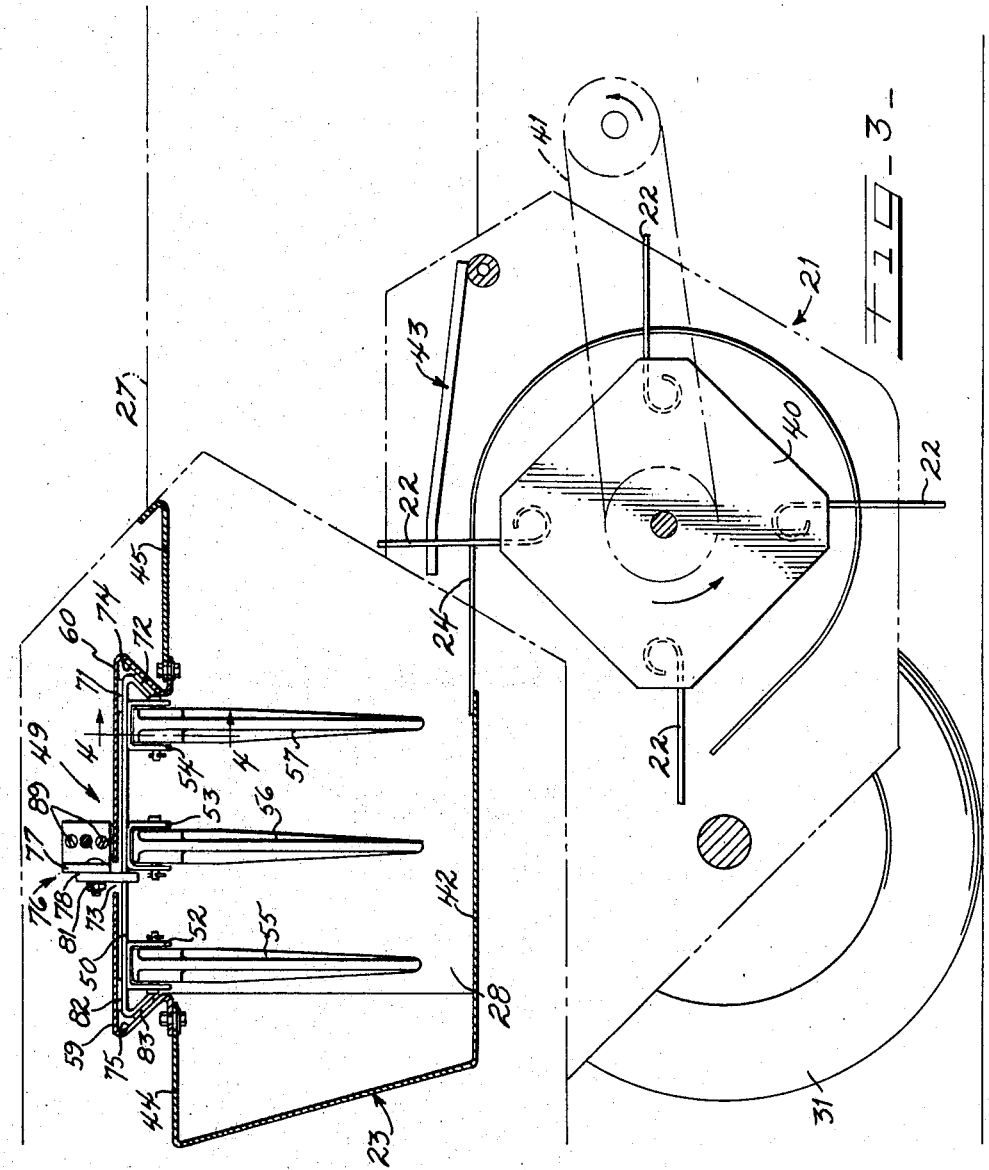

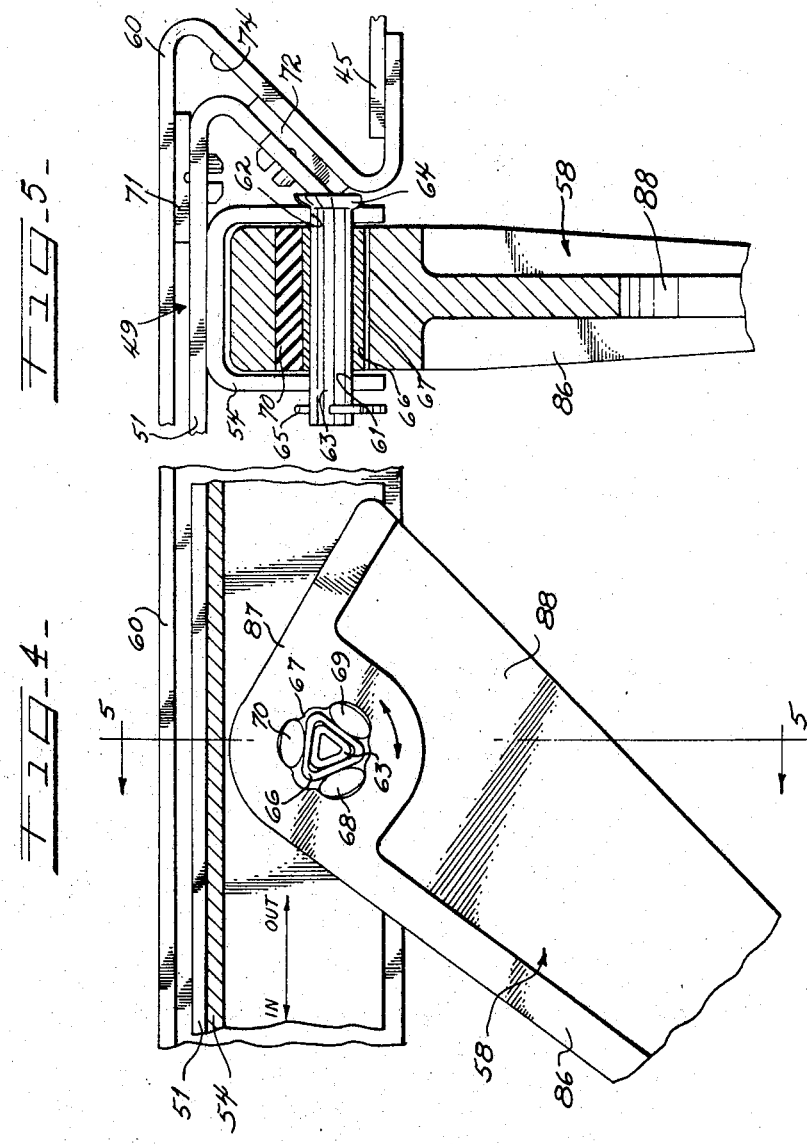

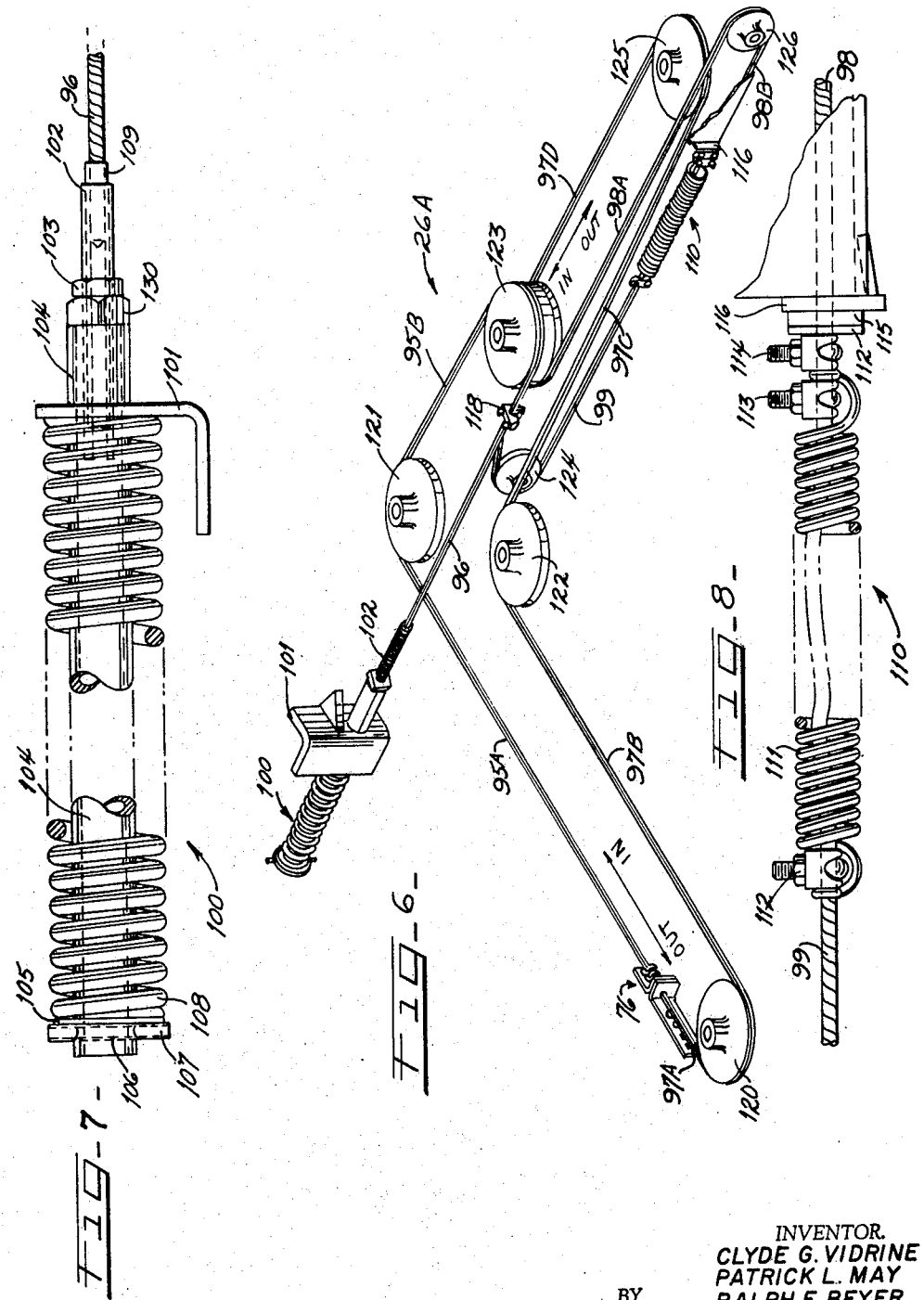

Dec. 30, 1969 P. L. MAY ET AL 3,486,439
AGRICULTURAL APPARATUS
Original Filed June 23, 1965 6 Sheets-Sheet 6

INVENTOR.
CLYDE G. VIDRINE
PATRICK L. MAY
RALPH E. BEYER
BY
ATT'Y.

United States Patent Office 3,486,439
Patented Dec. 30, 1969

3,486,439
AGRICULTURAL APPARATUS
Patrick L. May, Memphis, Tenn., Clyde G. Vidrine, Thibodaux, La., and Ralph E. Beyer, Memphis, Tenn., assignors to International Harvester Company, Chicago, Ill., a corporation of New Jersey
Original application June 23, 1965, Ser. No. 466,327. Divided and this application Aug. 2, 1967, Ser. No. 664,589
Int. Cl. B30b 15/20, 1/00; F16j 1/14
U.S. Cl. 100—142                                     5 Claims

ABSTRACT OF THE DISCLOSURE

A baler cross feed mechanism comprising a carriage reciprocally mounted on a pair of guide rails and having a plurality of fingers depending therefrom. The fingers are arranged to feed hay into the baling chamber on the feed stroke of the carriage. The guide rails which slidably support the carriage are in the form of angle members, each of which has a downwardly facing leg and an inwardly facing leg. A cable interconnecting the carriage and the plunger provides the force for driving the carriage in timed relation to the action of the plunger.

Cross-references to related applications

This is a division of application Ser. No. 466,327, filed June 23, 1965.

Background of the invention

This invention pertains to balers, in particular to a cross-feed carriage for a reciprocating finger-type of cross-feed mechanism for a baler.

The conventional field traversing hay baler removes hay from the ground and deposits it on the baler pickup platform. A cross-feed mechanism then transfers the hay from the pickup platform of the baling chamber. Various types of cross-feed mechanisms are used for this purpose. A common type is the floating auger cross-feed mechanism shown in U.S. Patent No. 2,450,082. Another type is the reciprocating finger cross-feed mechanism of U.S. Patent No. 2,948,101. The present invention provides an improved carriage for the latter type of cross-feed mechanism.

Like all devices, these prior art cross-feed mechanisms have strong and weak points. The floating auger-type cross-feed, for example, handles hay gently, so that the hay leaves, which are high in food value, are not knocked off the stems and lost. The drives for floating auger mechanism as well as the auger are, however, expensive to manufacture. The reciprocating finger-type of cross-feed mechanism is relatively simple but has a chain and sprocket drive which is noisy and, also, relatively expensive. Further, the chain driven cross-feed mechanism can get out of time with and be damaged by the baler plunger if the chain drive "jumps" the sprocket teeth during overload conditions.

Objects

A general object of this invention is to provide an improved cross-feed carriage for a baler cross-feed mechanism. Specific objects of the improved cross-feed carriage are to provide a carriage structure that is self-cleaning (i.e. one from which debris is readily eliminated) and to provide a carriage structure in which the clearance between the sliding members is conveniently adjusted.

Drawings

Certain preferred modes of the invention are shown in the drawings, where:

FIG. 1 is an isometric view of a hay baler, showing the relative position thereon of one form of the novel cable drive;

FIG. 2 is an elevation looking toward the front of the baler of FIG. 1, showing the pickup mechanism and platform and the cross-feed mechanism, the fingers of which are shown in three different operating positions by means of solid and broken lines;

FIG. 3 is a section through the pickup mechanism and platform and the cross-feed carriage, taken on line 3—3 of FIG. 2;

FIG. 4 is an enlarged section of a portion of the carriage and a feed finger taken on line 4—4 of FIG. 3, showing detailed aspects of the pivot mounting for the finger;

FIG. 5 is a detailed end view of the pivot mounting for the fingers of the cross-feed mechanism of FIG. 4;

FIG. 6 is an isometric view of the cable drive of FIG. 1, showing in detail the arrangement of the cable runs;

FIG. 7 is a top view of the cable relief spring unit indicated at 100 in FIG. 6;

FIG. 8 is a detail of the cable tension spring assembly shown at 110 in FIG. 6;

Description

Figure 9:
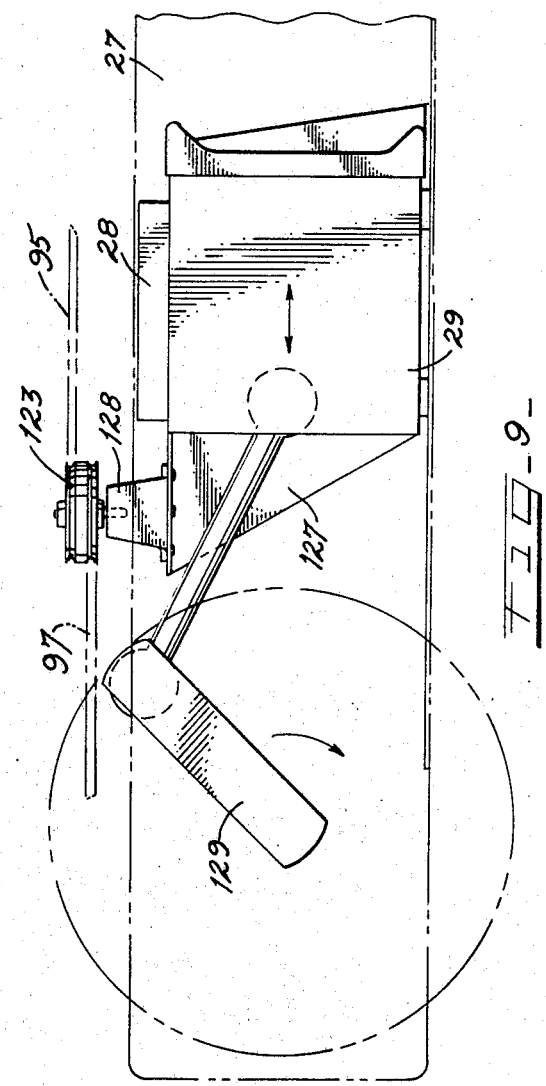
FIG. 9 is a detailed drawing of the double groove pulley mounted on the baler plunger, showing the mode of attachment of the pulley thereto.

A typical field traversing baler 20 (FIG. 1) is mounted on wheels 31 and comprises a rotary pickup mechanism 21 having pickup fingers 22, a pickup housing 23 including a pickup platform 24, a cross-feed mechanism 25, and a baling chamber 27 containing a reciprocable plunger 29. To bale a field crop, the baler is drawn across the field by a tractor (not shown). A power takeoff connection (not shown) from the tractor drives the components of the baler, i.e. the flywheel 33, the pickup mechanism 21, the cross-feed mechanism 25, the plunger 29, and the like. As the reel 40 (FIG. 3) of pickup mechanism 21 is rotated by drive 41, the radial pickup fingers 22 remove the crop from the ground and deposit it on the platform 24. Hold-down bar 43 limits the upward travel of the crop to direct it onto platform 24. Feeding of additional crop onto the platform 24 pushes the preceding charge back onto cross-feed platform 42. Cross-feed mechanism 25, which is reciprocated by cable drive 26, then moves the crop across the platform 24, through baling chamber inlet 28, and into baling chamber 27. Plunger 29, reciprocating in chamber 27, compacts the crop into a bale. Control of bale density is maintained by a conventional density control means 32 at the rear of the baler. The completed bale is bound by a conventional binding mechanism 30 and then discharged out opening 31 at the rear of the baler. More information about the cross-feed mechanism 25 and the cable drive 26 appears below.

Cross-feed mechanism

Cross-feed mechanism 25 (FIGS. 1–5) comprises a reciprocable carriage 49, a plurality of pivoted feeder fingers 55, 56, 57, and 58 and a pair of carriage guide rails 59, 60 for supporting and guiding the carriage. Guide rails 59 and 60 (FIGURES 1–5) are in the form of angle members, each of which have a downwardly facing leg and an inwardly facing leg, the downwardly facing leg being longer than the inwardly facing leg. Thus the openings of the angle members are toward one another and in a generally downward direction.

The rails extend laterally of the pickup housing and reach into the upper region of the baling chamber 27.

Rear guide rail 59 is mounted on rear deck 44 by means of detachable nuts and bolts. Elongated bolt holes in rail 59 permit adjustment of the rail to control the clearance between carriage 49 and rails 59 and 60. Front guide rail 60 is similar in construction to rail 59, however, its upper leg is of greater length than the corresponding leg of rear rail 59. Front rail 60 is permanently attached as by welding or the like to the front deck 45 of the pickup housing. Slot 73 separating rails 59 and 60 provides a way for travel of cable bracket 76 of carriage 49. Working surfaces 74 and 75 (FIGS. 3–5) of the rails slope downward so that thrash can fall out of thee cross-feed mechanism.

Carriage 49 (FIGS. 2–5) comprises a slide 50 and a slide 51, three finger bracket channels 52, 53, 54, a plurality of fingers 55, 56, 57, and 58 and a cable bracket 76. Slides 50 and 51 are made of steel plate and are bent into a U-shape or channel section, the legs of the channel section being bent inward. Rectangular plastic guide pads 71, 72, 82, 83, 84 and 85 attached (FIGS. 2, 3, 5) to each slide provide a self-lubricating bearing surface for the slides. The guide pads also promote quiet operation. Eight such pads are used on each slide 50 and 51, four on top and four on the downwardly facing surfaces of the legs of the channel section. The guide pads shown (FIG. 5) are of the so-called "pop-in" variety and are inserted into holes in the slides, a slit in the body portion of each guide pad enabling the guide pad to be inserted in the hole. These guide pads absorb the wear imposed by the continuous sliding of the carriage along the rails 59 and 60 and can be replaced when worn.

Brackets 52, 53, 54 (FIGS. 2–5) are made of steel plate and are bent into the U-shaped cross section shown. These brackets serve as stringers, to join the slides 50 and 51 together and are welded thereto. The mouth of the U faces downward, to provide a mounting for the feeding fingers, 55, 56, 57, and 58. There are six such fingers in the actual machine but only four (55–58) appear in the drawings, the fingers behind 55 and 56 being hidden from view.

The six feeder fingers are of identical construction and are described here by reference to the finger 58 (FIGS. 4–5). The feeder fingers shown are made of a plastic for lightness and strength but can be made of aluminum or a similar metal. Lightness is desirable in the fingers to reduce the high inertia forces and noise that otherwise results from the high reciprocating speed of the cross-feed carriage, the acceleration of the fingers being about seven times the acceleration of gravity.

Each finger such as 58 comprises a thin webbed portion 88 and a flat flange portion 86 extending around the top and leading edge of the finger, the flange 86 on the leading edge being the portion of the finger that contacts the crop. At the top of the finger 58, the flange assumes a hub form 87 containing a generally triangular bore 67 for mounting the finger on a pivot. Pivot sleeve 66 of triangular cross section fits in the bore 67 and confines three rubber or resilient plugs 68, 69, 70 that act as a bi-directional torsion spring on pin 63. Before insertion in bore 67, plugs 68, 69, 70 have a circular cross section but are deformed into the oval shapes shown when assembled in hub 87. The portion of finger 58 in FIG. 4 corresponds to the solid line finger position shown in FIG. 2, which is the neutral position of the finger. Pivot pin 63 also has a triangular cross section corresponding to that of sleeve 66, a head 64, and a body portion containing a hole for cotter 65. Pivot pin 63 passes through triangular holes 61, 62 in bracket 54 and the interior of sleeve 66 and is held in place by cotter pin 65.

When carriage 25 pushes inwardly across platform 42 to baling chamber inlet 28, finger 58 pivots against rubber plugs 68 and 70 to the vertical dotted line position in FIG. 2, thereby imparting a degree of resiliency to the finger. On the return stroke of carriage 25 to its outer position, finger 58 pivots to the horizontal, dotted line position in FIG. 2 to ride over the top of the hay on platform 42.

Finger 58 pivots in this instance against the rubber plug 69 and 70, which return finger to its feeding position when the carriage arrives at the outer position. The neutral position of the finger is located about half-way between the vertical and the horizontal positions. The rubber springs act as energy absorption means to cushion the finger 58 at both ends of its pivoting action, eliminating slapping noises that would otherwise occur as the finger reverses direction. The rubber plugs, the sleeve, and the hole in the flange are proportioned to place the rubber plugs under radial compression when assembled as shown.

Carriage bracket 76 (FIGS. 1–3) is attached to the cross-feed carriage 25 and links the carriage to the cable drive 26A. Bracket 76 comprises a tab 78 that fits through a slot in the top of cross-feed carriage slide 50 and is welded thereto. At the upper end of tab 78, two L-shaped bracket elements 77 and 79 are attached to the tab 78. Element 77 is fastened to tab 78 by bolts and nuts 81. Element 79 is attached in turn to element 77 by bolts and nuts 89 passing through the abutting legs of the two L-shaped brackets. A hole through the two abutting legs acts as a guide for the cable. Two cable clamps 80 are located on the non-abutting leg of element 79. These latter clamps allow a wide range of adjustment of the carriage along the cable.

Cable drive

The cable drives, used to transmit power from the baler plunger 29 to the cross-feed carriage 25, amplify the plunger stroke, so that the cross-feed carriage travels twice the distance of the baler plunger 29.

The cable drive 26A shown in FIGS. 1 and 6 comprises a continuous cable having runs 95, 96, 97, 98 and 99; a relief spring assembly 100; a tension spring assembly 110; a plurality of fixed, guide pulleys 120, 121, 122, 124, 125, 126; and a movable, double-grooved actuating pulley 123. For convenience, distinct portions of the various cable runs are identified below and in the drawings by letter suffixes, such as "A," "B," "C," and the like.

Anchor run 96 of the cable is fastened to the baler by means of the relief spring assembly 100 (described below). From relief spring assembly 100, anchor run 96 extends forward to the double-groove pulley 123 (described below), bends around that pulley to form a driving connection and extend backward as feed run 95B. Feed run 95B extends from pulley 123 to fixed pulley 121 and bends around the latter pulley to extend laterally across the top of pickup housing 23 as feed run 95A, where it is secured to carriage bracket 76 by means of the cable clamp 80 (described below). The cable continues from the bracket 76 as return run 97A, which bends about fixed guide pulley 120 at the outboard end of the pickup housing and extends back toward the baling chamber as return run 97B. At the baling chamber, return run 97B bends about fixed guide pulley 122 and heads toward the front of the baler as return run 97C. As fixed guide pulley 125, return cable run 97C bends thereabout and extends as return run 97D toward the double-groove pulley 123, about which it bends to form a driving connection and to reverse direction and extend back toward the front of the baler as second anchor run 98A. Anchor run 98A bends about fixed guide pulley 126 and passes through the flange 116 on the baler frame. On the other side of flange 116, tension spring unit 110 (described below) is attached to the cable. From tension spring unit 110 the cable is designated as return run 99, which extends about fixed guide pulley 124 and extends to anchor run 96, to which it (return run 99) is attached by clamp 118.

Relief spring assembly 100 attached to the end of anchor run 96 has an inner sleeve 109, which fits tightly into a bore in outer sleeve 102. Sleeve 102 is threaded along its length and is screwed into the thread of nut 130 attached to the end of tube 104. Nut 103 on outer sleeve 102 enables that sleeve to be locked in place with respect to tube 104. Tube 104 extends through a hole in bracket 101, which forms a rigid abutment on the baler. On the other side of bracket 101, tube 104 extends through a coil type compression spring 108 and projects out the far end thereof. A washer 105 on the outer end of tube 104 bears against the outer end of spring 108. A pin 107 inserted through hole 106 in tube 104 holds the relief spring assembly together, forcing spring 108 under load against bracket 101.

Spring 108 has two primary functions. One is to allow the carriage 25 and feeder fingers 55, 56, etc., to be relieved when an extra large charge of hay or some foreign object is encountered. Examples of such foreign objects are fragments of fence posts and tree roots. The second function of spring 108 is to maintain a constant tension on the cable, so that it tracks properly in the pulley grooves, and to take up any slack that develops in the cable. For these purposes spring 108 is preloaded to about 200 pounds. Constant cable tension is maintained by spring 108 from bracket 101 to flange 116 at slack spring 111, at the front end of the baler.

Each of pulleys 120, 121, 122, 124, 125 and 126 is attached to the baler to guide the various runs of the cable. While these pulleys are fixed in place, they are still free to rotate so that friction is reduced as the cable works back and forth around the pulleys.

Double-groove plunger pulley 123 (FIGS. 6, 9) is rotatably mounted on a ball bearing assembly and is supported on a standard 128 attached to a bracket 127 on the rear of baler plunger 29. As its name suggests, this pulley has two grooves for the drive cable, the grooves being located one above the other on a unitary pulley wheel member. When plunger 29 is reciprocated back and forth in the baling chamber 27 by crank mechanism 129, a point on pulley 123 moves a linear distance equal to the stroke of plunger 29.

Cable clamp 80 allows infinite adjustment of the carriage 25 along the cable runs 95A and 97A. Such adjustment is desirable so that the distance of penetration of the feeder fingers 55, 56, 57, etc., into the bale chamber 27 can be adjusted according to crop conditions to assure evenly packed bales. For example, in light crop conditions, the fingers should penetrate a greater distance into the baling chamber than for heavy crop conditions. The desired amount of penetration is attained by loosening cable clamp 80, resetting carriage 25 along the cable, and then tightening the clamp 80.

Slack spring unit 110 on the far side of the flange 116 comprises two cable clamps 113 and 114 attached to the cable to limit the distance the cable may move, two washers 112 and 115 on the cable that provide wear surfaces to separate clamp 114 from flange 116, a coil extension-type slack spring 111 attached to the cable at this point by clamps 112 and 113. Spring 111 is in an extended state when it is attached to the cable, so that the inherent tendency of the spring to contract pulls the ends of cable run 99 toward one another. Slack spring 111 therefore takes up slack in cable run 99 from flange 116 to cable clamp 118 on anchor run 96.

Operation

The operation of cable drive shown in FIGS. 1 and 6 is as follows: As plunger pulley 123 moves out, as indicated by the two-headed arrow in FIG. 6, it pulls on feed runs 95A and 95B of the cable, thereby moving carriage bracket 76 in toward the baling chamber. Since the anchor run 96 of the cable is fixed, only the cable in runs 95, 97 and 98 is moved by movement of plunger pulley 123. As plunger pulley 123 moves out, run 95B and the run opposite thereto (anchor run 96) become greater in length. Cable to provide this greater length is acquired from runs 97D and 98A. In other words, as plunger pulley 123 moves out, slack tends to be created in run 97D and 98A. However, since runs 95B and 96 are simultaneously increasing in length at an equal rate, the slack in runs 97D and 98A is immediately taken up and absorbed into runs 95B and 96. This slack wire moves from runs 98A into run 97D, about pulley 125 to run 97C, about pulley 122 to run 97B, and about pulley 120 to run 97A to bracket 76, which pulls the slack toward pulley 121. Bracket 76 moves twice the distance that pulley 123 moves, since cable run 95A supplies the cable for both runs of cable 95B and 96 to increase in length.

When plunger pulley 123 moves in (left), as shown by the two-headed arrow in FIG. 6, pulley 123 pulls on cable runs 97D and 98A, the pull being transmitted via cable runs 97C, 97B and 97A to the bracket 76, to pull carriage 25 in an outwardly direction. As plunger pulley 123 moves to the left (in), slack is created in cable runs 95B and 96, but this slack is immediately taken up at an equal rate by cable run 97D and 98A. In the actual machine, the plunger stroke is about twenty-eight inches; whereas the cross-feed carriage stroke is about fifty-six inches.

Overload conditions: should the cross-feed carriage 23 be blocked by an obstruction such as a fence post or large root, the relief spring 108 will yield and prevent damage to the cross-feed fingers. For example, referring to FIG. 6, overload conditions will cause pulley 123 to pull on cable run 96 and compress spring 108 in spring assembly 100, displacing cable from the relief spring side rather than the feeder carriage side.

Stretching of the cables is also compensated for by the relief spring units. The springs in the relief units are preloaded, so that as the cable stretches, the slack is taken up by a corresponding expansion of the respective compression spring.

The above description covers only the preferred modes of this invention and is not intended to limit the invention to those modes, since the invention embraces all equivalent forms that fall within the spirit and scope of the attached claims. Specific details have been given as illustrations only and are not to be construed as limitations on the invention.

The invention claimed is:

1. A cross-feed mechanism for a baler, comprising: a supporting structure; a first, elongated carriage guide means mounted on said supporting structure, said first guide means having a pair of guide surfaces forming first and second guide surfaces, said first guide surface being disposed at an angle to the horizontal and facing upwardly, said second guide surface being disposed at an angle to said first guide surface and facing downwardly; a second, elongated carriage guide means mounted on said supporting structure, said second guide means having a pair of guide surfaces forming a third and a fourth guide surface, said third guide surface being located opposite said first guide surface and being disposed at an angle to the horizontal and facing upwardly, said fourth guide surface being disposed at an angle to said third guide surface and facing downwardly; a cross-feed carriage having a plurality of downwardly facing carriage guide surfaces, a portion of said carriage guide surfaces being supported by said first guide surface and a portion of said carriage guide surfaces being supported by said third guide surface; feeding finger means on said cross-feed carriage; means for actuating said cross-feed carriage mounted thereon.

2. A cross-feed mechanism for a baler, as recited in claim 1, wherein: said first and third guide surfaces are flat, sliding surfaces and said carriage guide surfaces are flat, removable guide pads that slide along said first and third guide surfaces.

3. A cross-feed mechanism for a baler, as recited in claim 2, wherein: said second and fourth guide surfaces are flat, sliding surfaces and said cross-feed carriage carries flat, removable guide pads that slide along said second and fourth guide surfaces.

4. A cross-feed mechanism for a baler as recited in claim 1, wherein: said cross-feed carriage comprises a pair of U-shaped slide members, downwardly facing, removable guide pads are mounted on the legs of said U-shaped slide members in sliding relation with said upwardly facing first and third guide surfaces; a plurality of U-shaped feeding finger bracket channels connects said slide members together, said feeding finger means are mounted on said finger bracket channels.

5. A cross-feed mechanism for a baler, as recited in claim 1, wherein: said first and said third guide surfaces are spaced apart, and one of said first and said second carriage guide means includes threaded means for varying said space between said first and said third guide surfaces.

References Cited

UNITED STATES PATENTS

| | | | |
|---|---|---|---|
| 1,622,375 | 3/1927 | Dahmen | 308—3 |
| 2,581,602 | 1/1952 | Pulsifer. | |
| 2,768,406 | 10/1956 | Carle. | |
| 2,948,101 | 8/1960 | Long | 100—142 X |
| 2,953,864 | 9/1960 | Taylor. | |
| 3,054,645 | 9/1962 | Evans. | |
| 3,062,592 | 11/1962 | Allen | 308—3.6 |
| 3,068,784 | 12/1962 | McDuffie | 100—142 |
| 3,113,441 | 12/1963 | Weasler | 308—3 |
| 3,156,346 | 11/1964 | McDuffie | 100—142 |
| 3,391,894 | 7/1968 | Lynn | 308—3 X |

EDGAR W. GEOGHEGAN, Primary Examiner

L. L. JOHNSON, Assistant Examiner

U.S. Cl. X.R.

100—189; 308—3